Sept. 17, 1957 J. A. WEINER 2,806,286
COMBINATION KNITTERS GAUGE AND TAPE MEASURE
Original Filed Jan. 2, 1952
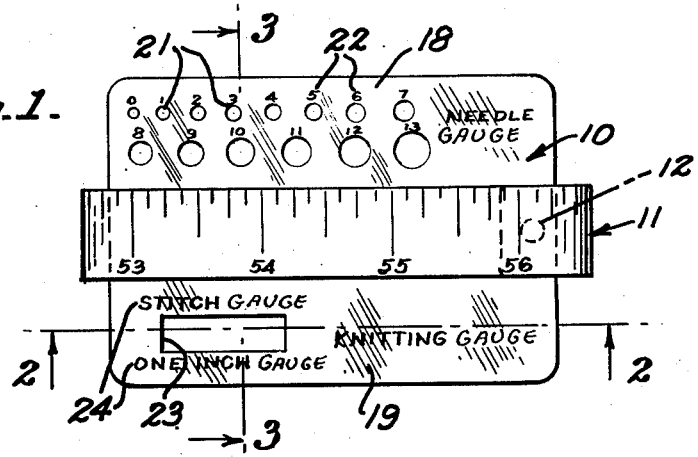
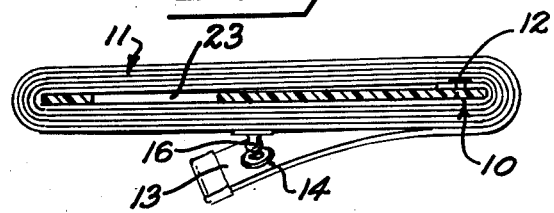
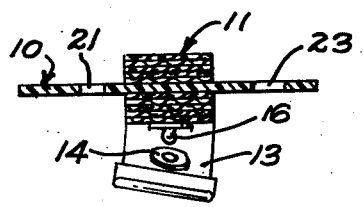
INVENTOR.
JESSIE A. WEINER
BY
Townsend and Townsend
ATTORNEYS.

2,806,286

COMBINATION KNITTER'S GAUGE AND TAPE MEASURE

Jessie A. Weiner, San Francisco, Calif.

Continuation of application Serial No. 264,510, January 2, 1952. This application May 7, 1954, Serial No. 428,258

1 Claim. (Cl. 33—2)

This invention relates to a new and improved measuring tape and knitter's gauge unit and is a continuation of my copending application Serial No. 264,510, filed January 2, 1952, now abandoned.

The particular embodiment of the invention which is illustrated in the drawings and which will be described hereinafter in more detail, comprises, generally, a gauge body, preferably formed of a relatively flat sheet material, and a measuring tape having one of its ends secured to the gauge body—the free end of the tape being adapted for winding about the gauge body and around itself in coiled relationship. The gauge body is constructed so as to present first and second exposed end portions which project outwardly to opposite sides beyond the path of tape winding. One exposed end portion of the gauge body is formed with a plurality of different size needle gauge apertures, each aperture being appropriately marked to designate the size or gauge of a knitting needle. The other exposed end portion of the gauge body is formed with a stitch gauge, which may comprise a rectangular cut-out calibrated in the same unit of measure as the flexible tape. In the embodiment shown in the drawings, the stitch gauge comprises a rectangular window or cut-out exactly one inch in length—the tape itself being calibrated in inches and fractions and multiples thereof. Complementary fastening elements are provided for removably securing the unattached end of the tape to the portion of the tape which said end overlies when the tape has been wound around itself in fully coiled relationship. The arrangement of the parts is such that the tape may be wound around the body of the gauge and fastened in coiled position while leaving both the stitch gauge and needle gauge apertures exposed for use. Conversely, both the needle and stitch gauge openings are also left exposed and available for use when the tape is in extended position.

A principal object of the invention is to provide an instrument for use by knitters which incorporates in a unitary structure a tape measure and means for gauging the size of needles and for gauging the number of stitches per inch.

Another object of the invention is to provide a device of the character above briefly mentioned which is particularly adaptable for inexpensive and mass production, and which is both compact in size and extremely durable in its construction.

Other objects of the present invention will become apparent upon reading the following specification and referring to the accompanying drawings in which similar characters of reference represent corresponding parts in each of the several views.

In the drawings:

Fig. 1 is a top plan view of an embodiment of the invention.

Fig. 2 is a sectional view taken along line 2—2 of Fig. 1.

Fig. 3 is a sectional view taken along line 3—3 of Fig. 1.

In the drawings, the reference numeral 10 designates a gauge body, preferably formed of a rectangular piece of relatively flat sheet material, such as sheet plastic or the like. A flexible measuring tape 11, having one of its ends attached, as by a rivet 12, to the gauge body, is adapted for winding about the gauge body and around itself in coiled relationship when not in use.

In order to secure end 13 of the tape in coiled relationship, complementary fastening elements, such as conventional snap fasteners indicated at 14 and 16, respectively, are provided. More specifically, snap fastener 14 is provided on the tape proximate the outer tape end 13 for snap fastening engagement with element 16, which, in turn, is located on the portion of the tape which end 13 overlies when the tape is securely wound about itself, as shown particularly in Fig. 2.

The gauge body is of sufficient size, and is otherwise proportioned to present exposed end-portions 18 and 19 which project outwardly beyond the path of tape winding.

Exposed portion 18 of the gauge body is formed with a needle gauge, consisting of a plurality of circular apertures 21 of different diameters representing different needle gauges. Each aperture is marked with appropriate indicia, as indicated at 22, to designate the size or gauge of the needle which the aperture represents.

The exposed end portion 19 of the gauge is formed with a stitch gauge shown in the drawings as comprising a one-inch cut-out or window 23. Preferably appropriate identifying indicia, as indicated at 24, is marked on the gauge body to designate the size of the window, in addition to its nature and purpose.

Indicia 22 and 24 may, of course, be marked on the gauge body by any suitable means or process, such as, for example, by stamping, etching or cutting the indicia permanently into the gauge body material.

From the foregoing, it is seen that the present invention provides an instrument for use by knitters which incorporates in a unitary structure and in combination, a tape measure and means for gauging the size of needles and for gauging the number of stitches per inch.

The projecting end portions 18 and 19 of the gauge body 10 not only provide areas on which the needle and stitch gauges may be provided, but said projecting ends provide convenient handle portions by which the gauge body may be manually grasped by a user as he winds or unwinds the tape with respect to said gauge body.

Although the present invention has been described in some detail by means of illustration and example for purposes of clarity of understanding, it is understood that certain changes may be made within the spirit of the invention and scope of the appended claim.

I claim:

A unitary knitting device comprising the combination of a support piece of relatively flat sheet material, a flexible measuring tape having its first end secured to said piece, the unsecured length of said tape being arranged for winding in one direction around said piece and around itself in coiled relationship, a first fastening element provided proximate the outermost extremity of said second end of said tape, a second fastening element complementary to said first element provided inwardly of the second end of said tape for detachable engagement with said first element when said tape is fully wound about itself in coiled relationship, and a rectangular stitch gauge aperture provided in said support piece adjacent the tape, said aperture being of a length exactly corresponding to the unit of measure of said tape, said aperture being disposed with its longitudinal axis parallel to the longitudinal axis of said tape and positioned in relation to said tape so that work disposed under said aperture is visually accessible when said tape is in coiled or uncoiled relationship with said support piece.

References Cited in the file of this patent

UNITED STATES PATENTS

| | | |
|---|---|---|
| 628,475 | Kirk | July 11, 1899 |
| 1,645,468 | Wilke | Oct. 11, 1927 |
| 2,048,090 | Zeiger | July 21, 1936 |

FOREIGN PATENTS

| | | |
|---|---|---|
| 323,182 | France | Oct. 31, 1902 |